United States Patent
Church (10) Patent No.: US 7,836,909 B2
(45) Date of Patent: Nov. 23, 2010

(54) ROTATABLE WEDGE VALVE MECHANISM AND METHOD FOR MANUFACTURE

(75) Inventor: Kris L. Church, Montgomery, TX (US)

(73) Assignee: Hemiwedge Valve Corporation, Conroe, TX (US)

( * ) Notice: Subject to any disclaimer, the term of this patent is extended or adjusted under 35 U.S.C. 154(b) by 1009 days.

(21) Appl. No.: 11/584,679

(22) Filed: Oct. 20, 2006

(65) Prior Publication Data

US 2008/0093575 A1  Apr. 24, 2008

(51) Int. Cl.
*F16K 1/14* (2006.01)
*F16K 5/06* (2006.01)

(52) U.S. Cl. .............................. 137/15.22; 137/315.17; 251/315.08; 251/315.16

(58) Field of Classification Search ............ 137/315.17, 137/454.2, 454.6, 15.22, 15.25; 251/315.16, 251/315.01, 315.08, 315.09
See application file for complete search history.

(56) References Cited

U.S. PATENT DOCUMENTS

| | | |
|---|---|---|
| 3,121,553 A | 2/1964 | Grove |
| 3,990,676 A | 11/1976 | Brownstein |
| 4,071,220 A | 1/1978 | Iino |
| 4,113,231 A | 9/1978 | Halpine |
| 4,137,936 A | 2/1979 | Sekimoto et al. |
| 4,247,079 A | 1/1981 | Friess |
| 4,718,444 A | 1/1988 | Boelte |
| 4,747,578 A | 5/1988 | Kivipelto et al. |
| 4,953,587 A | 9/1990 | Steele |
| 4,962,911 A | 10/1990 | Soderberg |
| 5,010,917 A * | 4/1991 | Iqbal ...................... 137/454.6 |
| 5,145,150 A | 9/1992 | Brooks |
| 5,333,834 A | 8/1994 | Soderberg |
| 5,507,469 A | 4/1996 | Soderberg |
| 5,533,738 A | 7/1996 | Hoffmann |
| 5,657,961 A * | 8/1997 | Kalsi et al. .................. 251/326 |
| 5,707,042 A | 1/1998 | Maselli et al. |
| 6,082,707 A | 7/2000 | Hosie et al. |
| 6,123,094 A * | 9/2000 | Breda ...................... 137/454.6 |
| 6,185,821 B1 | 2/2001 | Wu |
| 7,484,523 B2 * | 2/2009 | Church .................... 137/15.22 |
| 2006/0196544 A1 | 9/2006 | Soderberg |

* cited by examiner

*Primary Examiner*—Kevin L Lee
(74) *Attorney, Agent, or Firm*—Claude E. Cooke, Jr.; Burleson Cooke L.L.P.

(57) ABSTRACT

A rotatable wedge valve mechanism has a valve body or valve cartridge defining a valve chamber and flow ports in fluid communication with the valve chamber. A valve seat is located within the valve chamber in registry with one of the flow ports. A non-rotatable core member having a convex external surface portion is supported within said valve chamber. A wedge member is mounted for rotation within the valve chamber and has a range of rotary motion between open and closed positions of said valve and a non-uniform wall thickness throughout said range of rotary motion. An actuator upon rotary movement achieves opening and closing rotation of said wedge member. A method is provided for machining concave and convex wedge member surfaces from selected center-points to achieve relative thicknesses of wall sections of the wedge member.

20 Claims, 4 Drawing Sheets

ROTATABLE WEDGE VALVE MECHANISM AND METHOD FOR MANUFACTURE

RELATED PATENTS

The present invention is generally related to the subject matter of U.S. Pat. Nos. 4,962,911, 5,333,834 and 5,507,469, each issued to Paul B. Soderberg and each being commonly owned with respect to the subject matter hereof.

BACKGROUND OF THE INVENTION

1. Field of the Invention

The present invention relates generally to rotatable wedge valves that constitute improvements over the teachings of the Soderberg patents identified above. More specifically, the present invention concerns rotatable wedge valves having a rotatably actuated wedge member that has a geometry permitting force induced sealing with respect to seat members at both the open and closed positions of the rotatable wedge member. Even more specifically, the present invention is directed to a rotatable wedge valve mechanism that can be efficiently employed in replaceable cartridge valves as well as valves that must be assembled to or removed from a flow conduit as a valve unit.

2. Description of the Prior Art

Many valve types have been employed for stopping and controlling the flow of fluids in a pipe or other flow path. Each of these valves offers certain advantages while suffering from other disadvantages. These valve types include plug cock valves, ball valves, screw-down stop valves, angle valves, butterfly valves, gate valves and sluice valves.

A simple plug cock valve comprises a rotatable, tapered plug having a bore therethrough disposed in a complimentary tapered housing. The plug cock valve permits fluid flow to be fully stopped by rotating the plug not more than ninety degrees (90°). However, these valves offer only minimal graduated control of fluid flow by setting the plug cock at intermediate positions and require modification for use in high pressure environments.

Ball valves comprise a rotatable ball having a bore therethrough corresponding to the fluid flow path together with a seat for sealing with the ball surface. Ball valves operate similarly to the previously described plug cock valves and offer similar advantages and disadvantages. More accurate flow control is obtained with conventional screw-down stop valves wherein a circular sealing element is disposed on the end of a threaded actuator or stem for cooperation with a seat disposed about an opening through which the fluid flows. Rotation of the actuator gradually lifts the sealing element, such as a washer or other device, away from the seat to provide more accurate control of gradual changes in the fluid flow. A variation of the screw-down stop valve is the needle valve where the stem moves a tapered needle element linearly into a central opening of a circular seat member.

Conventional gate or sluice valves are often employed in high flow and high pressure operations. These valves comprise a solid gate which is moved perpendicularly into the fluid path to block the flow. These gates may have either flat or inclined sides forming a flat or wedge shaped gate which is moved generally perpendicular to the fluid flow by rotation of a threaded handle operatively connected thereto.

The valves described above fail to provide a valve operable between fully opened and fully closed positions in a quarter of one rotation or less while providing improved sealing in high pressure applications and shielding of the seat surface from erosion by the flowing fluid in both the opened and closed positions.

In the case of rotatable wedge valves it is well known that the rotatable wedge type valve element has a concave internal spherical surface portion that is engaged with the spherical external surface portion of a substantially immoveable core. The rotatable wedge element also defines an external convex spherical surface portion that is generated from a different center point as compared with the internal concave spherical surface and thus causes the valve element to have thick and thin wall portions. It is also known that the wall thickness of the rotatable wedge valve element increases gradually from its first leading end to its second or trailing end. Thus, in the closed position the thicker wall section of the rotatable wedge valve element will be positioned to apply a force to a valve seat, but in the open position of the rotatable wedge valve element the thin wall section will permit the valve element to have a range of movement within the valve chamber and permits the assembly and disassembly of the cartridge. It is desirable therefore to provide a rotatable wedge valve mechanism having a valve element geometry that causes development of seat engaging force at both the open and closed positions. It is also desirable to provide a method for manufacturing rotatable wedge valve members which permits the development of a variety of thick and thin wall sections that may be tailored to the needs of a customer.

It is well known that valves often become unserviceable and need repair or replacement. Especially in the case of rotatable wedge type valves it is typically necessary to shut down a flow line for an extended period of time during which the valve body is unbolted or otherwise released and removed from the flow line and replaced with another valve. It is desirable to provide a novel cartridge type rotatable wedge valve that can be efficiently restored for efficient service simply by removing and replacing a valve cartridge, thus eliminating the typical necessity to remove a valve housing from a flow line. Such cartridge valve is disclosed in U.S. Pat. App. Pub. No. US 2006/0196544 A1, the subject matter of which is incorporated herein by reference for all purposes.

Those skilled in the art have long sought and will appreciate the novel features of the present invention which solves these problems.

SUMMARY OF THE INVENTION

It is a principal feature of the present invention to provide a novel rotatable wedge valve mechanism having a rotatable wedge member that defines a pair of spaced relatively thick wall sections, which may be of differing thickness and having a relatively thin wall section between the relatively thick wall sections. The wall thickness of the rotatable wedge valve member achieves a wedging or camming activity with surfaces of increasing thickness from the thin wall section to the thicker wall sections, depending on the direction of rotational movement, applying mechanically enhanced force to seat members as the rotatable wedge member approaches its open or closed positions.

It is an important feature of the present invention to provide a novel rotatable wedge valve mechanism wherein three structural features, the trunnion for supporting the rotatable valve member, the outer and inner diameters of the rotatable valve member are each generated from one of three independent center-points. The relative positions of these three center-points have determining influence concerning the wall thickness of leading, trailing and intermediate curved regions of the valve member.

It is a feature of the present invention to provide a novel method for manufacturing a rotatable wedge valve member which permits the development of regions of valve wall thickness that are of greater thickness as compared with other regions and where in thicker regions of wall thickness may be tuned according to the intended service of the valve or the needs of a customer.

It is another feature of the present invention to provide a novel cartridge type rotatable wedge valve mechanism incorporating mechanical features that are applicable to more conventional valve designs and which are applicable to cartridge valve designs permitting simple and efficient replacement of a rotatable wedge valve cartridge within a valve body that remains connected within a flowline.

It is also a feature of the present invention to provide a novel rotatable wedge valve mechanism having a rotatable wedge valve member having a curved valve section defining a flow port and having a non-uniform wall thickness that defines an outer convex wall surface that causes increase and decrease of force on a valve seat member for enhanced control of forces at predetermined positions of the valve member.

It is another feature of the present invention to provide a novel rotatable wedge valve mechanism having trunnion and valve stem rotational support for a wedge valve member within a valve body and if desired having the trunnion or valve stem or both integral with the wedge valve member.

Briefly, the various objects and features of the present invention are realized through the provision of a rotatable wedge valve mechanism having improvements as compared with the valve mechanisms that are set forth in U.S. Pat. Nos. 4,962,911, 5,333,834 and 5,507,469 of Soderberg. Within a valve chamber of a valve body a core member is maintained in substantially immoveable position by a mechanical support system which can conveniently take the form of a seat assembly and a spacer member. If desired, the core member and the spacer member may be a single integral component. The core member defines an external spherical surface or spherical surface segments and is engaged by a corresponding concave spherical surface portion of a rotatable wedge valve member that is rotatable within the valve chamber and relative to the core member between open and closed positions. The rotatable wedge valve member may be of the floating variety or it may be supported for rotation within a valve body by a stem and trunnion arrangement. The stem and trunnion may be separate components having appropriate driving and supporting relation with the rotatable wedge valve member or may be integral components of the valve member for simplicity and efficiency of manufacture and assembly.

The rotatable wedge valve member is provided with an external, generally spherical surface that has a different center-point as compared with the center-point of the core member. The rotatable wedge valve mechanism has three basic structural features, a trunnion for supporting the rotatable valve member and the inner and outer diameter surfaces of the rotatable valve member are each generated from one of three independent center-points. The relative positions of these three center-points have determining influence concerning the wall thickness of leading, trailing and intermediate curved regions of the rotatable wedge valve member. The external, generally spherical surface of the rotatable wedge valve member is therefore generally eccentric relative to the concave inner surface external, generally spherical surface. Consequently, the outer generally spherical surface of the rotatable wedge valve member causes the wall thickness of the wedge member to define an intermediate thickness which merges with wedge regions of greater thickness than the intermediate thickness. Thus, when the wedge member is located at its open and closed positions the regions of greater thickness cause the development of force on the valve seat member or seat, spacer and/or core member which positively secures the valve components from being moved, such as by condition of flow, and provides for effective rigidity in the closed position. When the region of least thickness of the wedge member is positioned in facing relation with the seat member, the valve components have freedom of movement which permits the valve mechanism to be readily disassembled, such as to facilitate valve repair operations. The relationships of the inner and outer diameters of the rotatable wedge valve member in relation with the trunnion support of the valve member can be easily adjusted simply by adjusting the relative positions of the three center-points mentioned above. And if desired, two or all three of the center-points may be superimposed, depending on the wedging or interference relationships that are desired and depending on the valve service conditions that are intended. For example, by superimposing the center-points of the trunnion and the rotatable wedge valve outer diameter, a condition of non-varying interference will occur throughout the range of rotary motion of the valve member. Additional interference or force could be utilized by the third center-point which is the center-point of the inner diameter of the rotatable wedge valve member.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Figure 1:
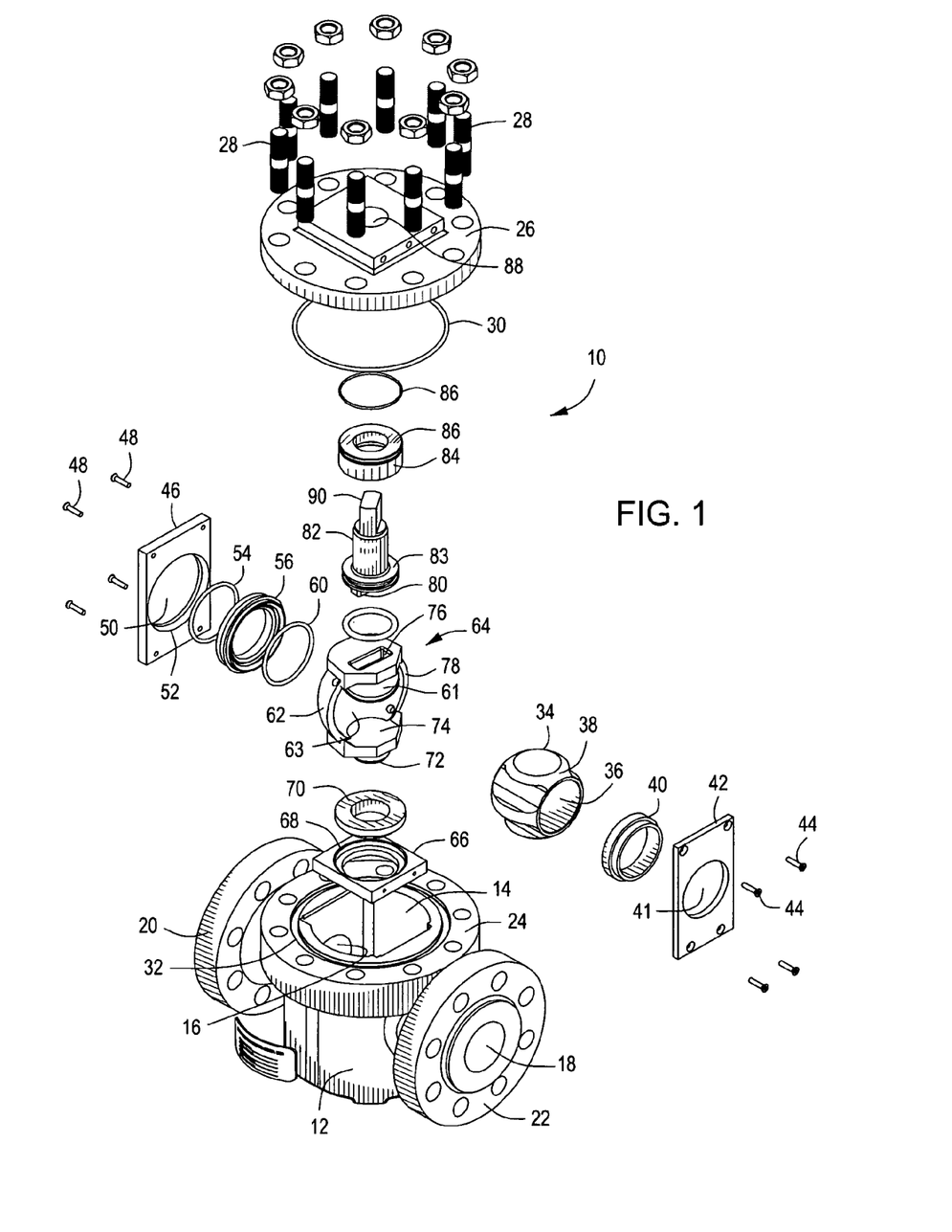
FIG. 1 is an exploded isometric illustration showing the various components of the valve mechanism and their relationships.

Referring now to the drawings and first to FIG. 1, a rotatable wedge valve mechanism is shown generally at 10 and embodies the principles of the present invention. FIG. 1 is an exploded isometric illustration showing the various components of the valve mechanism and their relationships. The valve mechanism 10 has a valve body or housing 12 defining an internal valve chamber 14 and having fluid flow passages 16 and 18 in communication with the valve chamber. The valve body is provided with connection members 20 and 22 enabling connection of the valve body to a flow line, not shown. The connection members are shown in FIG. 1 to be in the form of connection flanges that receive bolts or threaded studs that establish bolted mounting of the valve mechanism in a flow line having corresponding connection flanges. A variety of other flow line connection systems are commercially available and may be used for valve/flow line connection without departing from the spirit and scope of the present invention.

The valve body 12 defines a bonnet connection 24 that provides for secure mounting of a bonnet member 26 in secured and sealed relation with the bonnet connection of the valve body. Though the bonnet connection and bonnet are shown in FIG. 1 to be in the form of flange members that are secured in sealed assembly by means of a plurality of retainer threaded stud and nut assemblies 28 it is not intended to limit the spirit and scope of the present intention to bolted bonnet construction. A number of bonnet connection systems are commercially available at the present time and may be employed to secure a bonnet member in sealed and positively retained assembly with a bonnet connection of the valve body. FIG. 1 shows the use of an annular O-ring type seal 30 that engages within a circular seal groove 32 of the bonnet connection 24. Within the spirit and scope of the present invention, any of several commercially available types of bonnet seals, including elastomer O-ring seals, polymer seals, composite seals, metal seals may be employed according to the design and service characteristics of the valve mechanism.

A core member 34 is positioned in substantially fixed or non-rotatable relation within the valve chamber 14 and defines a flow port 36 and a spherical or partially spherical external surface 38. The core member defines an external spherical surface 38 which can be defined by a continuous spherical surface or can be defined by a number of spherical surface segments as shown in FIG. 1. The nonrotatable core member 34 is supported within the valve chamber by a valve spacer ring 40 which is received within an opening 41 of a spacer retainer member 42 having retainer members 44 such as retainer screws. Another spacer retainer member 46 is positioned within an opposite side of the valve chamber 14 and has retainer members 48 such as retainer screws. The spacer retainer member 46 has an opening 50 which defines an annular seat 52 receiving an annular seal member 54 which maintains a sealed condition between the spacer retainer member 46 and an annular valve seat 56. The valve seat 56 defines an annular seal groove 58 within which is positioned a circular seal ring 60.

Figure 2:
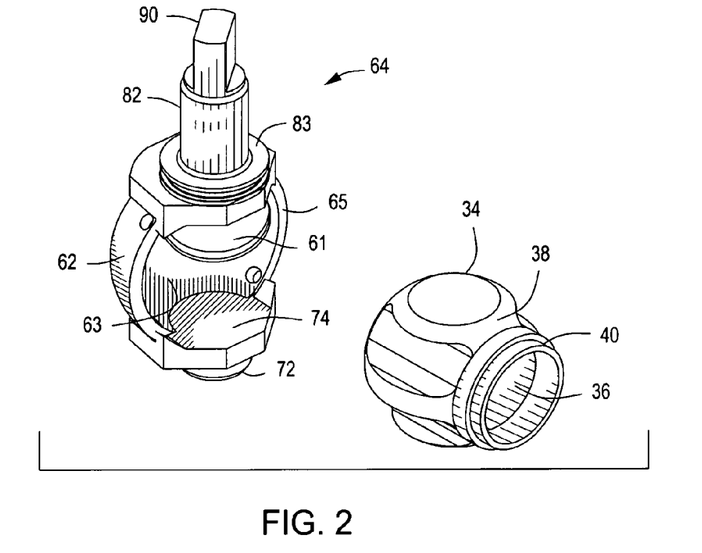
FIG. 2 is an exploded isometric illustration showing the rotatable wedge valve member and valve stem assembly in greater detail and showing an integral core member and spacer member.

The circular seal ring 60 is disposed for sealing engagement with an external surface 62 of an integral rotatable wedge valve member shown generally at 64 and shown in greater detail in FIG. 2. The rotatable wedge valve member 64 defines a flow port 61, which may be of any suitable configuration that suits the character of intended service of the valve mechanism. The external or convex surface 62 and an internal concave surface 63 cooperatively define the geometry of a rotatable wedge valve wall 65. The rotatable wedge valve member 64 is supported for rotation within the valve chamber by a valve base plate 66 that is shown in FIG. 1 to be of generally rectangular configuration and is received in non-rotatable relation within a generally rectangular bottom portion of the valve chamber 14. The valve base plate 66 defines an upwardly facing generally circular recess 68 within which is received a valve trunnion bushing member 70. A trunnion member 72, projecting downwardly from a lower trunnion plate or trunnion support structure 74 of the integral rotatable wedge valve member 64, is received and supported for rotation within the valve chamber by its supported engagement with the trunnion member 72. Though the trunnion support structure is presented in the drawings as being in the form of a plate-like structure that is integral with the rotatable wedge valve member, it is not intended to restrict the spirit and scope of the present invention to such a plate-like structure. The trunnion support structure may have any other design characteristics that will permit the rotatable wedge valve member to be simply and efficiently supported for rotary movement within the valve chamber 14.

The integral rotatable wedge valve member 64 also defines an upper force resisting plate-like stem engaging member 76, which may have other suitable geometry within the spirit and scope of the present invention. The stem engaging member 76 defines a stem connection, which may be in the form of a depression or receptacle 78 or may have any other geometric form that permits a non-rotatable relationship to be established between the stem engaging member 76 and a drive member 80. The drive member may project downwardly from a valve drive stem 82 and engage within the depression or receptacle 78. In the alternative the rotatable wedge valve member may be provided with a drive connection that establishes non-rotatable driving relation between a rotatably supported valve stem and the valve member.

The valve stem 82 defines an annular bearing support shoulder 83 which is disposed for engagement by a valve thrust bushing member 84 having a central opening within which a generally cylindrical portion of the valve stem is received. An annular seal member 86 is mounted to the valve thrust bushing member 84 and serves to establish sealing between the valve stem and the bonnet member 26. An upper portion of the valve stem extends through a central opening 88 of the bonnet member and presents an upper stem drive member 90 above the bonnet member and in position for connection of a valve actuator member thereto.

Referring particularly to FIG. 2, there is shown an enlargement of the rotatable wedge valve member 64 of FIG. 1, thus showing the structural features thereof in detail. The rotatable wedge valve member 64 has a flow port 61 and defines a concave internal surface 92 which is disposed in moveable guided relation with respect to the convex external surface or surface segments 38 of the core member 34. As set forth in the prior art, namely U.S. Pat. Nos. 4,962,911 and 5,333,834 of Soderberg, the external convex surface of the wedge member is arranged to increase in thickness throughout its curvature from a thin region to a thick region. When the thin region is positioned opposite the valve seat, which is the open position, the valve element can have movement relative to the valve seat. The external convex surface 62 of the rotatable wedge valve member of the present invention, due to the thick, thin, thick geometry of the wedge member, causes the wedge member to tightly engage the valve seat or seat, spacer and/or core at both the open and closed positions thereof.

Figure 3:
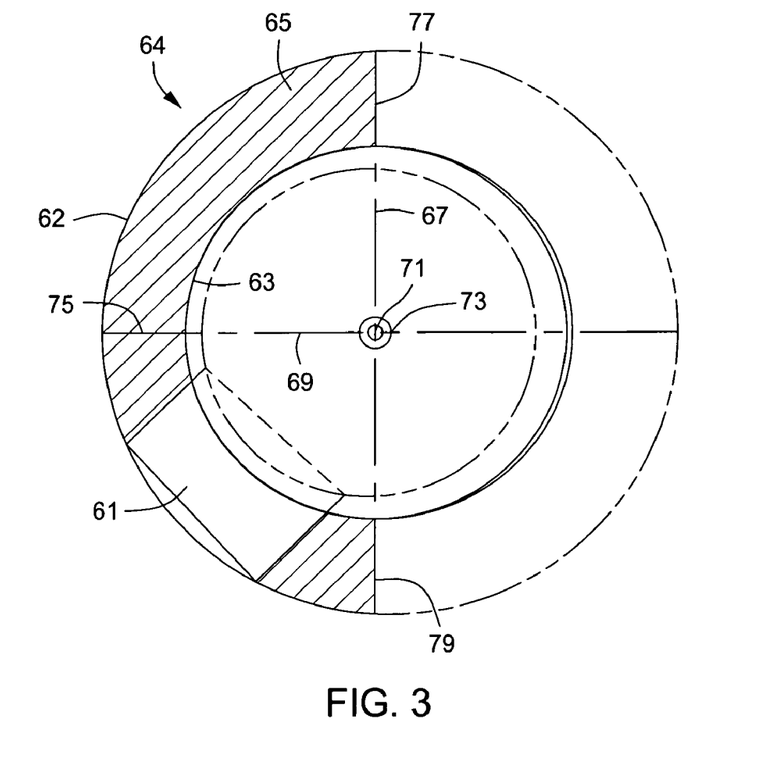
FIG. 3 is a diagrammatic illustration in plan showing the manufacturing process for developing rotatable wedge valve member regions of different thicknesses in comparison with the various rotational positions thereof.

Referring now to FIG. 3, there is shown a schematic illustration of the relationship of the rotatable wedge member 64 and the substantially stationary core member 34. The geometry of the rotatable wedge valve mechanism is shown schematically in the plan view of FIG. 3. Rotatable wedge valve wall thickness "A" represents the thickness between the trunnion member and the outer diameter (OD) of the rotatable wedge valve member in the open position. Valve wall thickness "B" represents the thickness of the valve wall 65 structure between the trunnion member and the outer diameter (OD) of the rotatable wedge valve member when the rotatable wedge valve member has been rotated to an intermediate or half-way position between the open and closed positions thereof. Rotatable wedge valve wall thickness "C" of FIG. 3 represents the thickness between the trunnion member and the outer diameter OD of the rotatable wedge valve member in the closed position. Rotatable wedge valve wall thickness "A" can be greater that or equal to "B". "C" can be greater that or equal to "B" according to the design parameters that are dictated by the intended valve service or by the design parameters that are required by a customer. Rotatable wedge valve wall thickness "C" can be greater than or equal to or less than "A". Therefore, greater interference between the valve member and the seat and spacer member exists in the open and closed positions of the rotatable wedge valve member as compared with the intermediate position. Also, rotatable wedge valve wall thicknesses "A", "B" and "C" do not necessarily influence the function of the rotatable wedge inner diameter (ID). In the event "A", "B" and "C" are equal or approximately so, then the rotatable wedge ID would influence the OD in the open, closed and intermediate positions.

The internal and external surfaces of the rotatable wedge valve member are each generated from independent center-points and the relationship of these center-points in large measure controls the wall thickness and wedging geometry of the valve member throughout its range of rotary motion. If consistent interference is desired throughout the leading, intermediate and trailing sections of the rotatable valve member, the center-point from which the outer diameter surface is generated can be superposed with the center-point of the trunnion and the inner diameter surface. In the event a rotatable wedge valve member having a thick intermediate section is needed, such as for throttling service, the center-point of the outer diameter surface can be off-set toward the intermediate valve section in relation with the center-point of the trunnion. And if the intermediate valve section is intended to have less thickness as compared with the leading and trailing valve sections, then a center-point for the outer diameter surface can be off-set from the trunnion center-point in a direction away from the intermediate valve section. Likewise, leading and trailing valve wall thicknesses can be achieved by lateral location of the center-point of the outer diameter valve surface.

Within the spirit and scope of the present invention a unique method has been developed to provide for controllable manufacture of a rotatable wedge quarter turn valve mechanism for achieving desired interference at both the open and closed positions of the rotatable wedge valve member and to selectively control the amount of interference according to the intended valve service condition or the needs expressed by a customer. With further reference to the diagrammatic illustration of FIG. 3, and in correspondence with FIGS. 1 and 2, reference number 62 identifies the outer generally spherical surface of the rotatable wedge valve member and reference numeral 61 identifies the flow port of the valve member. Reference numeral 67 identifies a vertical reference line and reference numeral 69 defines a horizontal reference line that is disposed in normal relation with respect to reference line 67. A center-point 71 is defined by the intersection of reference lines 67 and 69. In the event the rotatable wedge valve member is supported for rotation by a trunnion, center-point 71 will be the center-point from which the trunnion is generated.

Using center-point 71 the substantially spherical inner or concave surface 63 is machined on a rotatable wedge valve workpiece, thus defining the inner surface of the rotatable wedge valve member. This inner surface, being substantially spherical, is disposed in essentially surface to surface bearing and guided engagement with the external spherical surface or surface segments of the core member 34. It is desirable that the external convex surface of the rotatable wedge valve member, also be of substantially spherical configuration to promote simplicity and efficiency of machining but that it be arranged in eccentric relation with respect to the center-point 71 to provide an outer convex rotatable wedge valve surface that is located to provide a relatively thin wall section between and merging with leading and trailing wall sections of greater thickness as compared with the thin wall section. This feature is accomplished, as shown in FIG. 3 by machining a substantially spherical surface from a center-point 73 that is spaced from the center-point 71 and located at a desired location along the reference line 69. When this is done, an intermediate thin rotatable wedge valve section will be defined and will have its least wall thickness being defined by thickness measurement 75. The rotatable wedge valve wall thickness regions of greater thickness will gradually increase in thickness from the thickness measurement 75 and will have their greatest thickness measurements at 77 and 79. When the outer substantially spherical surface is machined from the center-point 73, since this center-point is located on the reference line 69 at a selected distance from the reference line 67, the wall thicknesses of the leading and trailing sections of the rotatable wedge valve member will be of equal thickness.

Figure 3A:
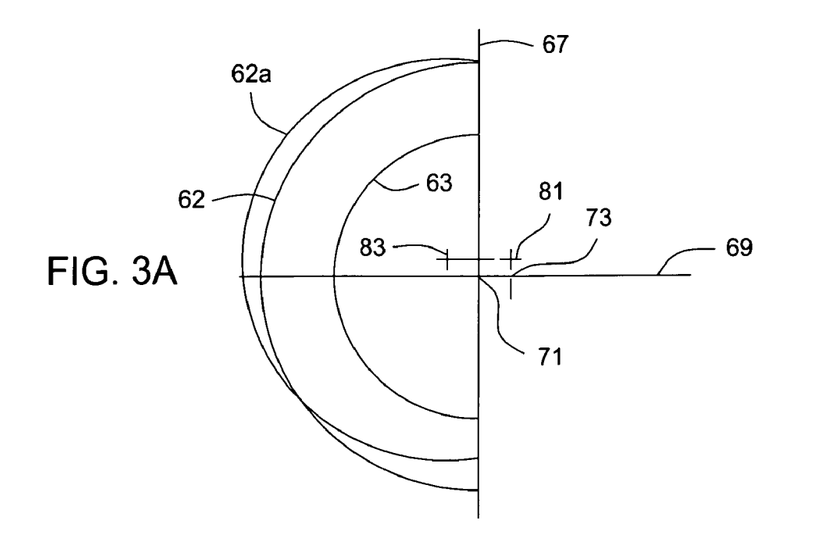
FIG. 3A is a simplified diagrammatic illustration similar to that of FIG. 3 and showing the principal and alternative methods for machining a rotatable wedge valve member

Referring to FIG. 3 and also to the simplified valve machining method schematic of FIG. 3A, it is to be understood that rotatable wedge valve members having alternative leading, intermediate and trailing wall sections of different thickness and different geometric relationships are possible within the spirit and scope of the present invention. For example, it may be desirable to develop leading and trailing wall thicknesses of different thickness. This feature will ensure different compressive force values of the rotatable wedge valve member at the open and closed positions of the valve. This feature results from the use of a different center-point for the outer convex surface as compared with FIG. 3. As shown in FIG. 3A, machining of the outer convex surface of a rotatable wedge valve member from a center-point 81 on reference line 69 but spaced to one side of reference line 67 will develop an outer generally spherical surface 62a which is positioned to provide a leading edge that is of greater thickness as compared with the trailing edge and an intermediate wall section of greater thickness as compared with the leading and trailing wall sections. The trailing edge of the rotatable wedge valve member may have a greater thickness than the leading edge simply by generating the outer spherical surface 62 from a selected center-point that is different from the center-point from which the inner or concave valve surface 63 is generated. If it is desired that an intermediate wall section of the rotatable wedge valve be of greater thickness than the leading and trailing edges or one of the leading and trailing edges, such as for throttling service, this can be done by selection of a center-point such as is exemplified by center-point 83. This rotatable wedge valve geometry would cause the valve member to have its greatest compressive force engagement with the valve seat in the intermediate valve position, which would have benefit in throttling service or for maintaining particular flow rates. Thus, it is intended that the geometry of the rotatable wedge valve member be controlled by selecting the relative positions of the center-points from which the surfaces and the trunnion are generated. If desired, the positional relationships of these center-points may be adjusted relative to one another or superposed with one another according to the intended service of the rotatable wedge valve mechanism.

Figure 4:
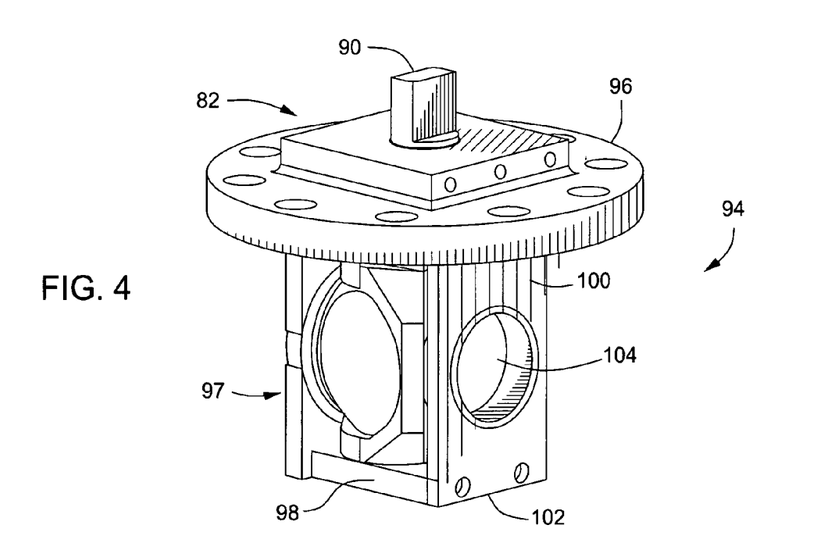
FIG. 4 is an isometric illustration showing a rotatable wedge valve cartridge that is constructed according to the principles of the present invention.

Though the rotatable wedge valve mechanism of FIG. 1 is shown with the moving valve components contained within a valve chamber of a valve body, it should be borne in mind that a valve body can be provided which defines a cartridge chamber that is adapted to receive a replaceable valve cartridge. The valve cartridge may be constructed so as to have a bonnet member or section which is secured to the valve body by means of any suitable bonnet retainer connection. In the alternative a valve body having a bonnet closure may be employed within the spirit and scope of this invention and may be employed to seal the valve body after a valve cartridge has been inserted into the valve chamber. An example of a cartridge type rotatable wedge valve mechanism is shown in FIG. 4.

It should be borne in mind that the principles of the present invention are applicable to standard valves and cartridge valves as well. As shown in FIG. 4 a rotatable wedge valve cartridge, shown generally at 94, is provided with an integral bonnet member 96 that is fixed to a cartridge housing 97 having side walls or plates 98 and front plates 100 as well as a bottom plate 102. The front plates are provided with flow ports 104 that correspond to and fit in registry with the fluid flow passages of a valve body. While a generally rectangular valve cartridge is shown in FIG. 4, it is not intended to limit the scope of the present invention to rectangular cartridge housings. Cartridge housings of conical, cylindrical, tapered or any other suitable configuration may be employed without departing from the spirit and scope of the present invention. Within the cartridge housing 97 the various valve components such as the core, rotatable wedge valve member, valve seats and spacers are positioned substantially as shown in FIG. 1. The cartridge assembly 94 is simply installed within a correspondingly shaped cartridge chamber of a valve body and secured within the valve body by any suitable bonnet retainer mechanism. The valve stem 82 and valve actuator connection 90 project upwardly from the bonnet member 96 to provide for actuation of the valve mechanism.

Figure 5:
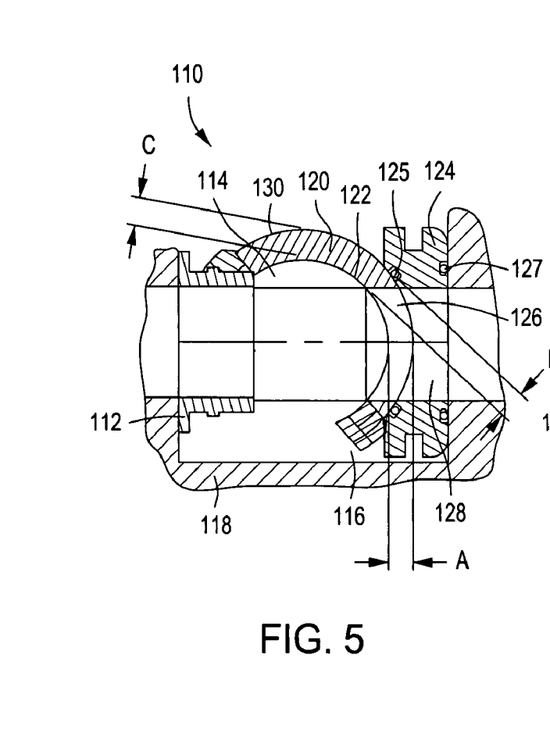
FIG. 5 is a longitudinal sectional view showing the internal valve components of a rotatable wedge valve mechanism representing an alternative embodiment of the present invention and being shown in the valve open position.
Figure 6:
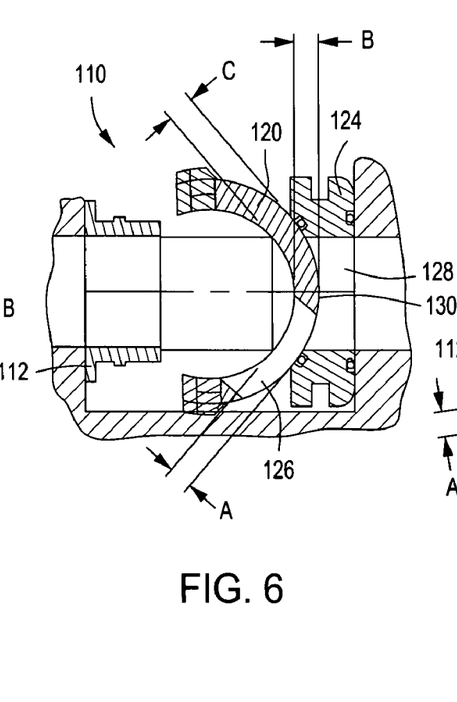
FIG. 6 is a longitudinal sectional view similar to that of FIG. 5 and showing the rotatable wedge member of the valve in an intermediate position between the open and closed positions.
Figure 7:
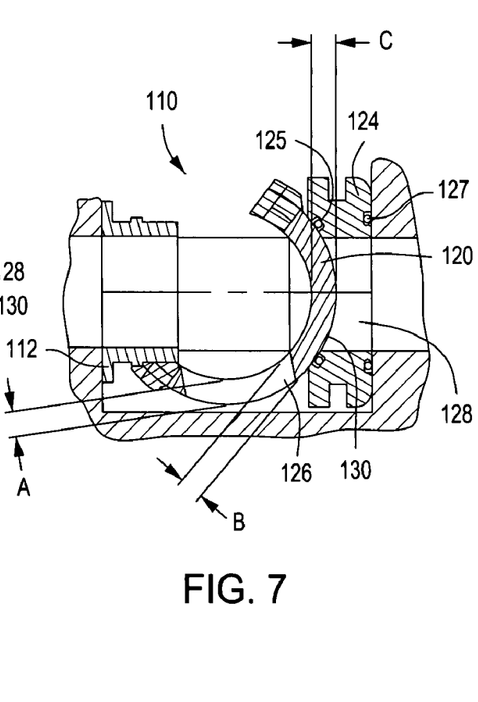
FIG. 7 is a longitudinal sectional view of the rotatable wedge valve mechanism of FIGS. 5 and 6, showing the wedge member of the valve having been rotated to the closed position.

Referring now to FIGS. 5-7 the open, intermediate and closed positions of a rotatable wedge valve mechanism, shown generally at 110, are presented. This valve mechanism, which also embodies the principles of the present invention, employs a spacer member 112 which secures a core member 114 within a valve chamber 116 of a valve body 118. It should be borne in mind that the valve body 118 may be designed with an internal cartridge receptacle or cavity for receiving and containing a rotatable wedge valve cartridge of the character shown in FIG. 4. The internal components of the valve assembly include a rotatable wedge valve member 120 which is supported within the valve chamber 116 for rotation about an outer generally spherical surface portion 122 of the core member 114. The rotatable wedge valve member 120 is also disposed in sealing engagement with a seat member 124 and defines a valve port 126 that is positioned in aligned registry with a flow port 128 of the seat member 124 when the rotatable wedge valve member is at its open position as shown in FIG. 5 or has been rotated to an intermediate position as shown in FIG. 6. The seat member 124 may be constructed of a wide variety of materials including metal, polymer or a composite of different acceptable seat materials for the intended service of the valve. A pair of annular sealing members 125 and 127, such as metal, elastomer or polymer O-ring seals are contained within annular seal grooves of the seat member. The rotatable wedge valve member 120 has a geometry defining an intermediate portion having a predetermined wall thickness and which merges smoothly with wall portions of greater thickness, thus providing a thick-thin-thick wall thickness arrangement. At the open and closed positions of the rotatable wedge valve member 120 the thicker portions of the rotatable wedge valve member are in engagement with the valve seat and thus cause expansion and tight sealing of the valve assembly. The partially open position of the valve mechanism, as shown in FIG. 6, provides a loosened condition of the internal valve components due to the presence of a rotatable wedge valve region of less thickness and permits the internal components to be simply and efficiently remove from the valve chamber 116. The fully closed position of the rotatable wedge valve member is shown in FIG. 7. In this position the external surface 130 of the valve member is disposed in sealing engagement with the annular seal ring 125 and prevents fluid flow through the valve mechanism.

The position of the rotatable wedge valve member will effectively control the amount of interference and the amount of clearance of valve components. The valve mechanism will seal effectively and resist flow induced vibration or chattering when the valve member is at particular positions. Also, when assembly or disassembly of valve components is desired, the rotatable wedge valve member is selectively position to permit the existence of sufficient clearance to permit valve components to be inserted or removed. Regarding FIGS. 5-7, an embodiment of the present invention is shown generally at 110 and represents various operative positions of the rotatable wedge valve member and the valve assembly length that is influenced by the various positions of the thick-thin-thick characteristics of the rotatable wedge member 120. These relative rotatable wedge valve lengths or measurements are described from the standpoint of various operative positions of the valve member within the valve chamber 116. In these FIGS. spaced parallel lines are presented which identify component length measurements. In the open position of the valve mechanism, shown in FIG. 5, component or component thickness measurements "A", "B" and "C" cause the development of sufficient interference to permit the rotatable wedge valve member to establish sealing engagement with the circular seal ring 125 and to cause sealing ring 127 to be forced against the internal surface of the valve body with sufficient interference to develop an efficient seal. Reference "A" represents the wall thickness of the rotatable valve member that engages the seat member 124 when the valve member is fully open. Reference "B" identifies the wall thickness of the rotatable valve member that engages the seat member 124 when the valve member is located an intermediate rotary position between the open and closed positions. Reference "C" identifies that portion of the wall thickness of the rotatable valve member that engages the seat member 124 when the valve member is at its fully closed position. Though these wall thickness regions may vary only a few thousandths of an inch, they provide the valve mechanism with controlled interference at different valve positions. This feature permits efficient sealing at certain valve positions and provides for no or low interference at other valve positions, such as a position for assembly and disassembly of valve components. At the intermediate position of the rotatable wedge valve member 120 as shown in FIG. 6 a thin wall section of the valve member will be disposed in facing relation with the seal assembly and thus the assembled valve components with be in loose or low interference assembly. This condition of low interference will permit the valve components to be maintained in operative relation and will permit the valve components to be easily removed from the valve chamber when repair or component replacement becomes necessary.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A rotatable wedge valve mechanism, comprising:
   a valve body having a valve chamber and flow ports in fluid communication with said valve chamber;
   a valve seat within said valve body;
   a core member having convex external surface portions and being located in substantially nonrotatable relation within said valve chamber;
   a variable wedge member having rotatable supported engagement with said core member and having a range of rotary motion between open and closed positions of said valve mechanism, said variable wedge member having non-uniform wall thickness throughout said range of rotary motion; and
   an actuator achieving opening and closing rotation of said wedge member.

2. The rotatable wedge valve mechanism of claim 1, comprising:
   said variable wedge member having a concave internal surface engaging said convex external surface of said core member and having a convex external surface engaging said valve seat; and
   said concave internal surface and said convex external surface each being generated from spaced center-points.

3. The rotatable wedge valve mechanism of claim 1, comprising:
   said wedge member having an external convex surface and an internal concave surface being mounted for rotation within said valve chamber between said core member and said valve seat, said wedge member defining an intermediate wall section of a predetermined thickness located between and merging with wedging wall sections each having a thickness greater than said predetermined thickness.

4. The rotatable wedge valve mechanism of claim 3, comprising:
   said wedging wall sections having substantially the same wall thickness.

5. The rotatable wedge valve mechanism of claim 3, comprising:
   said wedging wall sections having wall thickness of differing dimension.

6. The rotatable wedge valve mechanism of claim 3, comprising:
   said wedge member being rotatably positionable at open and closed positions;
   said external convex surface having an intermediate position with said intermediate wall section of a predetermined thickness being located in facing relation with said valve seat and having low interference wedging force engagement with said valve seat; and
   said external convex surface having open and closed wedging positions with said wedging wall sections applying sealing force of said external convex surface with said valve seat.

7. The rotatable wedge valve mechanism of claim 1, comprising:
   said wedge member having a trunnion member projecting therefrom, said trunnion member supporting a part of said wedge member for rotation within said valve chamber; and
   said concave internal surface and said convex external surface and said trunnion member each being generated from independent center-points.

8. The rotatable wedge valve mechanism of claim 7, comprising:
   a valve stem projecting from said wedge member and having supported rotatable engagement with said valve body.

9. A rotatable wedge valve mechanism, comprising:
   a valve body defining a valve cartridge chamber and having flow ports in fluid communication with said valve cartridge chamber;
   a cartridge housing being replaceably positioned and sealed within said cartridge chamber and having flow ports in registry with said flow ports of said valve body;
   a valve seat within said cartridge housing;
   a core member having generally convex external surface portions being located in substantially nonrotatable relation within said cartridge chamber;
   a wedge valve member having a range of rotary motion between open and closed positions of said valve mechanism and having non-uniform wall thickness throughout said range of rotary motion; and
   an actuator having rotary driving engagement with said wedge valve member and achieving opening and closing rotation of said wedge valve member.

10. The rotatable wedge valve mechanism of claim 9, comprising:
    said wedge valve member having a generally spherical internal surface engaging said convex external surface of said core member and having a convex external surface engaging said valve seat; and
    said internal generally spherical surface and said convex external surface being generated from spaced center-points.

11. The rotatable wedge valve mechanism of claim 9, comprising:
    said wedge valve member having an external convex surface and an internal concave surface being mounted for rotation within said valve chamber between said core member and said valve seat, said wedge member defining an intermediate wall section of a predetermined thickness located between and transitioning gradually with wedging wall sections each having a thickness greater than said predetermined thickness.

12. The rotatable wedge valve mechanism of claim 11, comprising:
    said wedge valve member being rotatably positionable at open and closed positions;
    said external convex surface having an intermediate position with said intermediate wall section of a predetermined thickness being located in facing relation with said valve seat and providing clearance permitting less wedging force against said valve seat; and said external convex surface having open and closed wedging positions with said wedging wall sections applying sealing force of said external convex surface to said valve seat.

13. The rotatable wedge valve mechanism of claim 9, comprising:

said wedge valve member having a trunnion member projecting therefrom, said trunnion member supporting a part of said wedge member for rotation within said valve chamber; and.

a valve stem projecting from said wedge member and having supported rotatable engagement with said valve body.

14. The rotatable wedge valve mechanism of claim 13, comprising:

said trunnion member and sand valve stem being integral with said wedge valve member and each being rotatably supported by said cartridge housing.

15. The rotatable wedge valve mechanism of claim 9, comprising:

a bonnet member being mounted to said cartridge housing and being adapted for secure sealed connection with said valve body.

16. The rotatable wedge valve mechanism of claim 9, comprising:

a bonnet member being adapted for secure sealed connection with said valve body and securing said rotatable wedge valve cartridge within said cartridge chamber of said valve body.

17. A method for manufacturing a rotatable wedge valve member, comprising:

generating a substantially spherical concave surface on a valve member workpiece from a first center-point:

generating a substantially spherical convex surface on the valve member workpiece from a second center-point being spaced from said first center-point to establish an intermediate valve member thickness and leading and trailing valve member thicknesses that merge with said intermediate valve member thickness being of different thickness as compared with said leading and trailing valve member thicknesses.

18. The method of claim 17, wherein a trunnion member projects from said rotatable rotatable wedge valve member and provides rotational support therefore, said method comprising:

generating a trunnion member from a third center-point being independent from said first and second center-points; and establishing desired relative positions of said first, second and third center-points and determining the geometric relationships of said substantially spherical concave and convex surfaces of said rotatable wedge valve member.

19. The method of claim 17, comprising:

establishing intersection first and second reference lines having 90° intersection, the intersection thereof defining a first center-point;

generating said substantially spherical concave surface from said first center-point;

establishing a second center-point being off-set from said first center-point and being on said first reference line; and generating said substantially spherical convex surface from said second center-point.

20. The method of claim 17, comprising:

establishing intersection first and second reference lines having 90° intersection, the intersection thereof defining a first center-point;

generating said substantially spherical concave surface from said first center-point;

establishing a second center-point being off-set from said first center-point and being off-set from said first and second reference lines; and generating said substantially spherical convex surface from said second center-point.

* * * * *